United States Patent [19] [11] 3,864,030
Cornsweet [45] Feb. 4, 1975

[54] EYE POSITION MEASURING TECHNIQUE

[75] Inventor: Tom N. Cornsweet, Washington, D.C.

[73] Assignee: Acuity Systems, Incorporated, McLean, Va.

[22] Filed: July 11, 1972

[21] Appl. No.: 270,639

[52] U.S. Cl........................ 351/7, 356/4, 356/152, 351/39
[51] Int. Cl.............................................. G01c 3/08
[58] Field of Search............ 351/6, 7; 356/4, 5, 152

[56] References Cited
UNITED STATES PATENTS

| | | | |
|---|---|---|---|
| 2,524,807 | 10/1950 | Kallman................................. | 356/4 |
| 3,348,050 | 10/1967 | Bez........................................ | 356/4 |
| 3,614,214 | 10/1971 | Cornsweet et al...................... | 351/7 |
| 3,639,041 | 2/1972 | Cornsweet.............................. | 351/7 |
| 3,724,932 | 4/1973 | Cornsweet et al...................... | 351/7 |

OTHER PUBLICATIONS
"Optar–A New System of Optical Ranging," Electronics, 4-1950, pp. 103.

Primary Examiner—Maynard R. Wilbur
Assistant Examiner—S. C. Buczinski
Attorney, Agent, or Firm—Cushman, Darby & Cushman

[57] ABSTRACT

Apparatus and method for determining the relative position of an eye with respect to some apparatus. In the exemplary embodiment, relative eye positions in all three directions may be simultaneously monitored in both direction and magnitude. Displacements along any of the usual $x$, $y$ and $z$ coordinate directions are detected by processing the image of a light source reflected from the eye cornea which acts as a partially reflecting convex mirror. Eye displacements in a plane ($x$, $y$ plane) perpendicular to the optic axis of the eye are measured by detecting the phase and magnitude of corneal reflections with respect to the phase of driving signals used to periodically energize a plurality of light sources in a predetermined sequence. Eye displacements along the eye optical axis ($z$ axis) are measured by measuring the percentage of amplitude modulation introduced by corresponding movements of the reflected corneal image in the $z$ direction between two light chopping devices. If displacements along only one coordinate axis are to be detected, subcombinations of the apparatus and techniques disclosed in the exemplary embodiment for simultaneous three dimensional detection of eye displacements may be utilized individually in a simplified fashion to obtain measurements of eye displacements along any desired number of coordinate directions.

15 Claims, 11 Drawing Figures

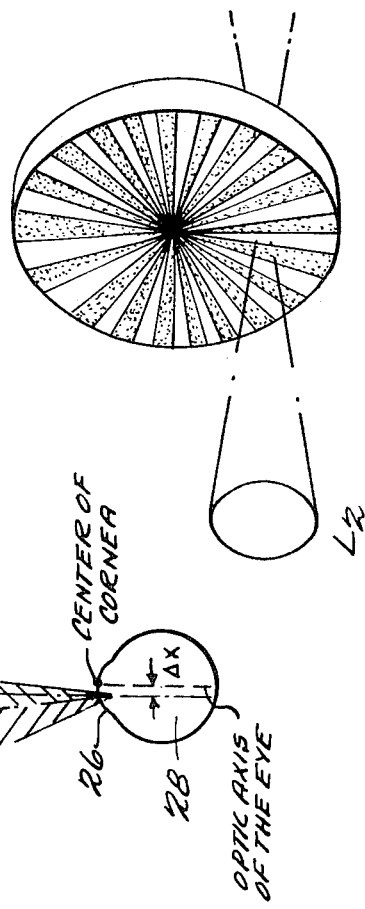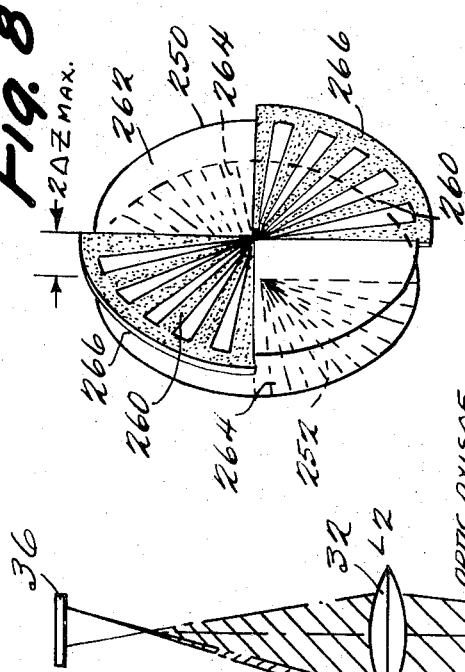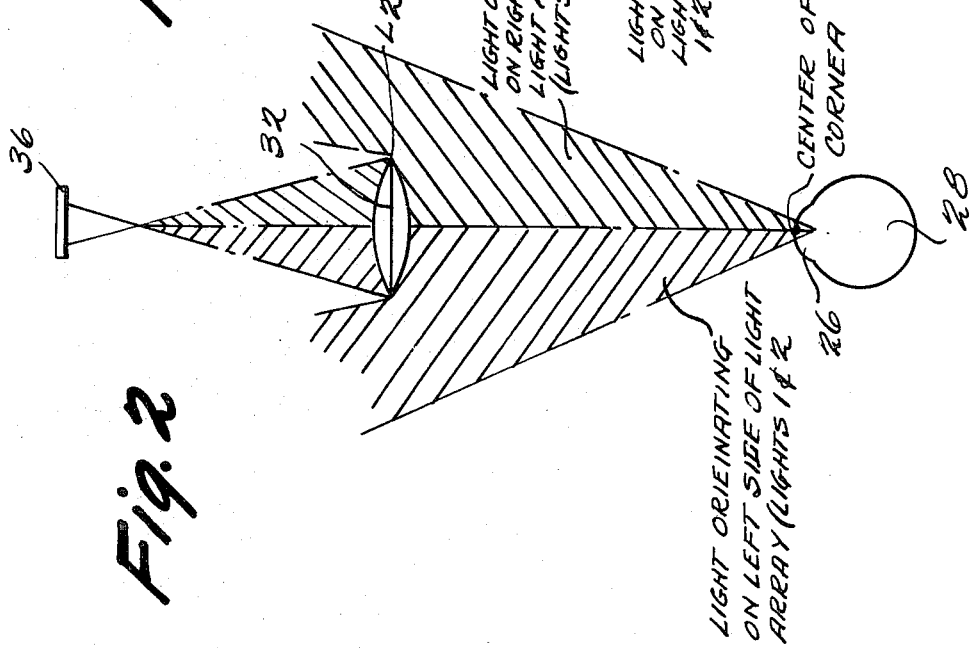

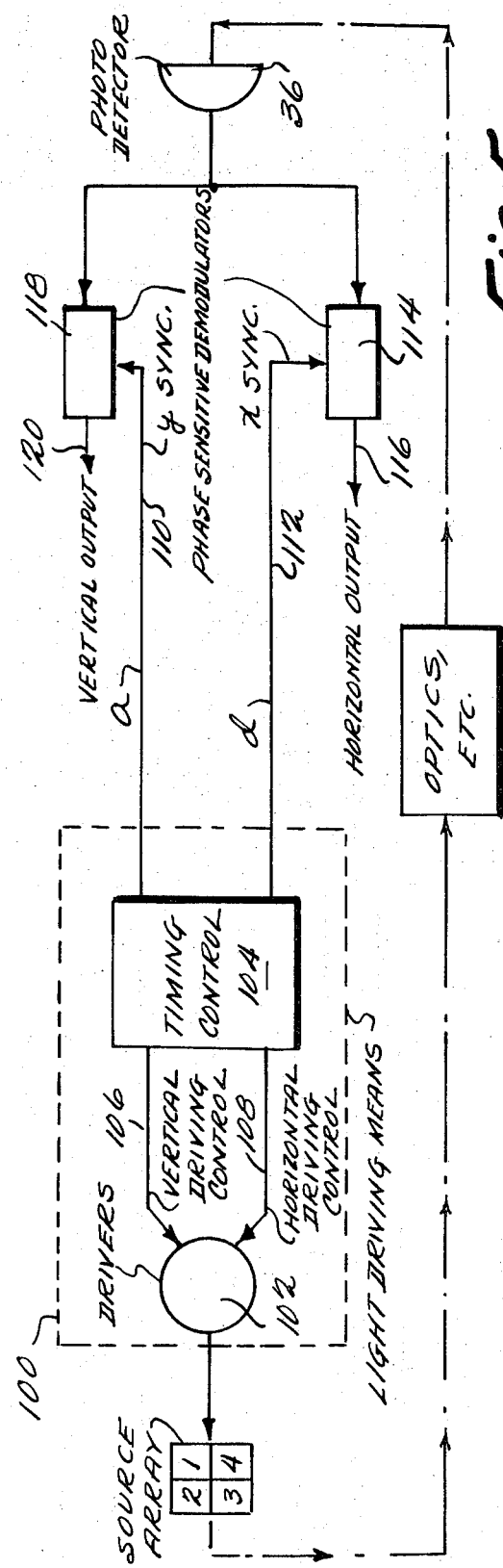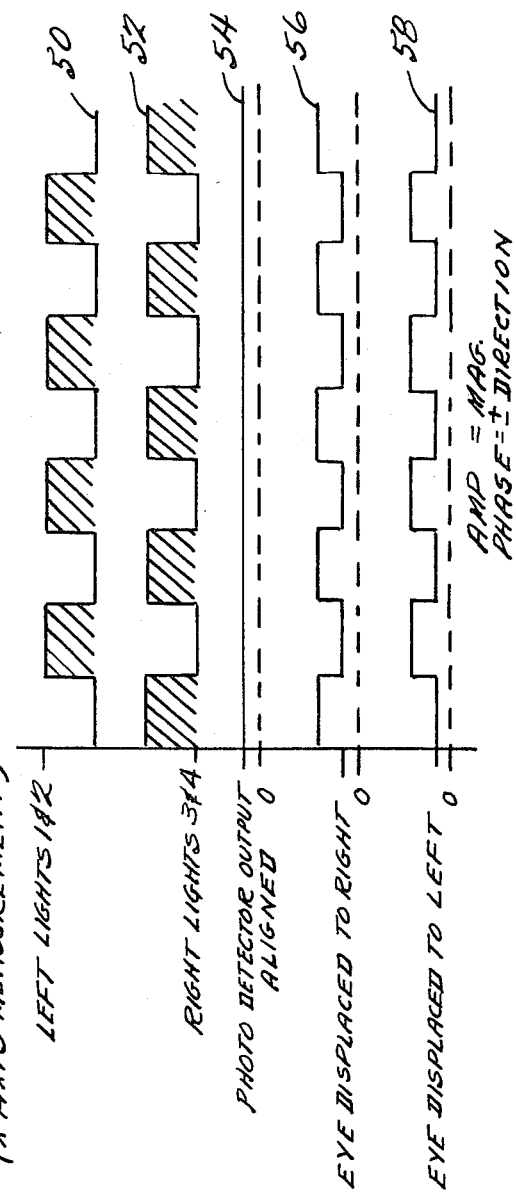

EYE POSITION MEASURING TECHNIQUE

This invention generally relates to a device and technique for determining the relative position of an eye with respect to some piece of apparatus by providing electrical signals representative thereof.

More specifically, this invention relates to an apparatus for detecting eye displacements by processing light images reflected from the cornea of an eye. By processing these corneal reflections as described below, electrical signals are derived representing the direction and/or magnitude of eye displacements along 1, 2 or 3 dimensions as may be desired.

Devices such as this invention for measuring eye position are extremely useful in several different contexts. Besides being of considerable interest for use in basic research on the eye, such a device as this invention is also very useful when used in combination with other optical instruments which must be very accurately maintained at predetermined relative positions with respect to the eye structure while being operated. Since it is often very difficult for a subject to maintain his eyes in an exactly fixed condition, this invention provides signals indicative of the eye's actual position which may be used in a closed loop servo system for effecting corresponding compensating movements of the associated optical instrument such that a desired predetermined relative position between the eye and the associated optical instrument is maintained in spite of slight movements of the eye structure.

It is often desirable, when using ophthalmological instruments and in performing research on the eye, to be able to align an optical device accurately with the eye, and to monitor continuously the accuracy of alignment. For example, when using an instrument designed to determine the refractive state of the eye, it is important that the measurement be made at a precisely controlled region of the entrance pupil of the eye, since the refractive powers of most eyes vary across their entrance pupils. The technique described herein provides, as outputs, three voltages whose amplitudes are continuous measures of the relative position of the instrument and the eye in three axes, $x$, $y$, and $z$. (The $x$ axis refers to the horizontal position of the eye, the $y$, to the vertical position, and the $z$, to the axial position, that is, the distance from the instrument to the eye.)

In addition, this invention may find use in an environment where normal bodily movements are substantially inhibited but where eye movements may still be made with considerable ease. In these kinds of environments (such as accelerating jet planes and/or space vehicles) the present invention may be utilized to provide control signals for use as desired. Other uses for this invention will be appreciated by those in the art.

To help understand this invention, the usual rectangular orthogonal $x$, $y$, $z$ coordinate system will be utilized although those in the art will readily appreciate that other kinds of coordinate systems might also be adapted for use with this invention if desired. With the eye located at some predetermined nominal position, the center of the eye's cornea (which acts as a convex mirror) will coincide with the origin of the $x$, $y$, $z$ coordinate system to be described. The $x$ and $y$ axes of this coordinate system are generally parallel to a plane which is perpendicular to the optic axis of the eye while the $z$ axis of the coordinate system is aligned with the optic axis of the eye. As viewed from behind the eye's cornea, eye movements in the right hand direction and upwards will be considered in the positive $x$ and $y$ directions respectively while movements forward will be considered in the positive $z$ direction.

To detect displacements in the $x$ coordinate direction, a light source will be imaged onto the cornea. The light source is a special kind of source including at least two physically distinct sources of light which may be independently activated or one moving light source. When the eye is at its nominally centered position (the center of the cornea being at the origin of the $x$, $y$, $z$ coordinate system), activation of at least one of the light sources (or movements of a single source to a predetermined position) will cause illumination of the right hand side of the cornea while illumination of at least another different one of the light sources will cause illumination of the left half of the eye's cornea. As long as the eye remains in its nominal position, the reflected light image from the cornea (corneal reflection) is collected onto a light sensitive detector which produces a substantially constant output regardless of which half of the cornea is being illuminated (assuming that the two light sources are of equal intensity).

However, when the eye moves from the nominal position along the $x$ axis in either the left or right direction, the light sensitive detector will receive more light when one of these light sources is activated than when the other light source is activated. By detecting the phase relationship between the detector output and the driving signals causing alternate activation of the left and right hand light sources, the direction of eye movement may be detected.

That is, if the eye moves in a right hand direction (along the positive $x$ axis) the detector output will be increased when a certain one of the light sources is activated and decreased when the other light source is activated. Accordingly, by comparing the phase of the detector output with the signals driving the light sources, as in-phase condition may represent movement along one direction of the coordinate $x$ axis while out-of-phase conditions represent movement along the opposite direction of the $x$ axis. With properly configured light sources and detectors, the magnitude of the detector output is representative of the magnitude of movement. Accordingly, both the direction and magnitude of movement along the $x$ axis may be detected by a phase sensitive detector which compares the output of the light sensitive detector with signals that are used to drive the left and right hand light sources.

Detection of eye positions in the y direction are exactly analogous to detection in the $x$ axis as previously discussed except for the fact that the light sources employed in this instance must illuminate the plus $y$ and minus $y$ halves (i.e., up and down respectively with respect to the nominal eye position) of the cornea rather than plus $x$ and minus $x$ (i.e., right hand side and left hand side) as in the previously described example for the $x$ axis direction. If simultaneous detection of both $x$ and $y$ axes eye movements are desired, this may be obtained by effectively interleaving activation of the plus $x$ and minus $x$ cornea illuminating light sources with the plus $y$ and minus $y$ light sources as is described in more detail below.

Detection of eye positions in the $z$ axis direction is also accomplished by processing the corneal reflection of the light source array. However, in this case, a slightly different processing technique is involved. The corneal reflection is collected and imaged at a predetermined location intermediate of two light chopping means.

The light chopping means in front of the imaged corneal reflection is activated in alternation with the light chopping means located behind the imaged corneal reflection. As the eye moves along the z axis from a nominal position (where the imaged corneal reflection is exactly midway between the two light chopping means) the reflected corneal image makes similar corresponding movements within the two light chopping means. As the reflected corneal image moves nearer one or the other of the light chopping means, it will be more effectively chopped or modulated by the light chopping means toward which it is moving. If the reflected corneal image in fact coincides with one of the light chopping means, there will be 100 percent chopping or modulation by that corresponding chopping means.

On the other hand, if the reflected corneal image is located somewhere intermediate the two light chopping means, then something less than 100 percent modulation or chopping will occur because the image will be somewhat blurred in the plane of the light chopping means, thus allowing some of the light to pass by the chopping means at all times.

Since the two different light chopping means are activated in alternation, the direction of eye movement along the z axis may be determined by comparing the phase of the photodetected light passing through both light chopping means with a signal representative of the alternation of the two light chopping means. The magnitude of movement in the z direction will be proportional to the percentage modulation or chopping as just discussed. Accordingly, an output signal representing both the direction and magnitude of the z axis displacement may also be obtained.

The objects and advantages of this invention will be more completely appreciated by reading the following detailed disclosure in conjunction with the accompanying drawings, of which:

FIG. 2 is a diagram depicting the distribution of reflected light from an eye cornea when the eye is located in its nominally centered position;

FIG. 3 is a diagram depicting the distribution of corneal reflected light where the eye is displaced to the right (plus x direction) of the nominal eye position;

FIG. 4 is a plot showing the phase relationships between light driving signals and photodetector outputs for eye displacements along the x axis;

FIG. 5 is a schematic diagram of the electrical portions of an exemplary embodiment of this invention for measuring simultaneous eye movements in the x and y planes;

FIG. 8 is a perspective view of an exemplary light chopping means for detecting eye movements in the z axis direction;

FIG. 9 depicts another light chopping means which may be used and which is also useful in explaining the operation of the light chopping means as shown in FIG. 8;

Figure 1:
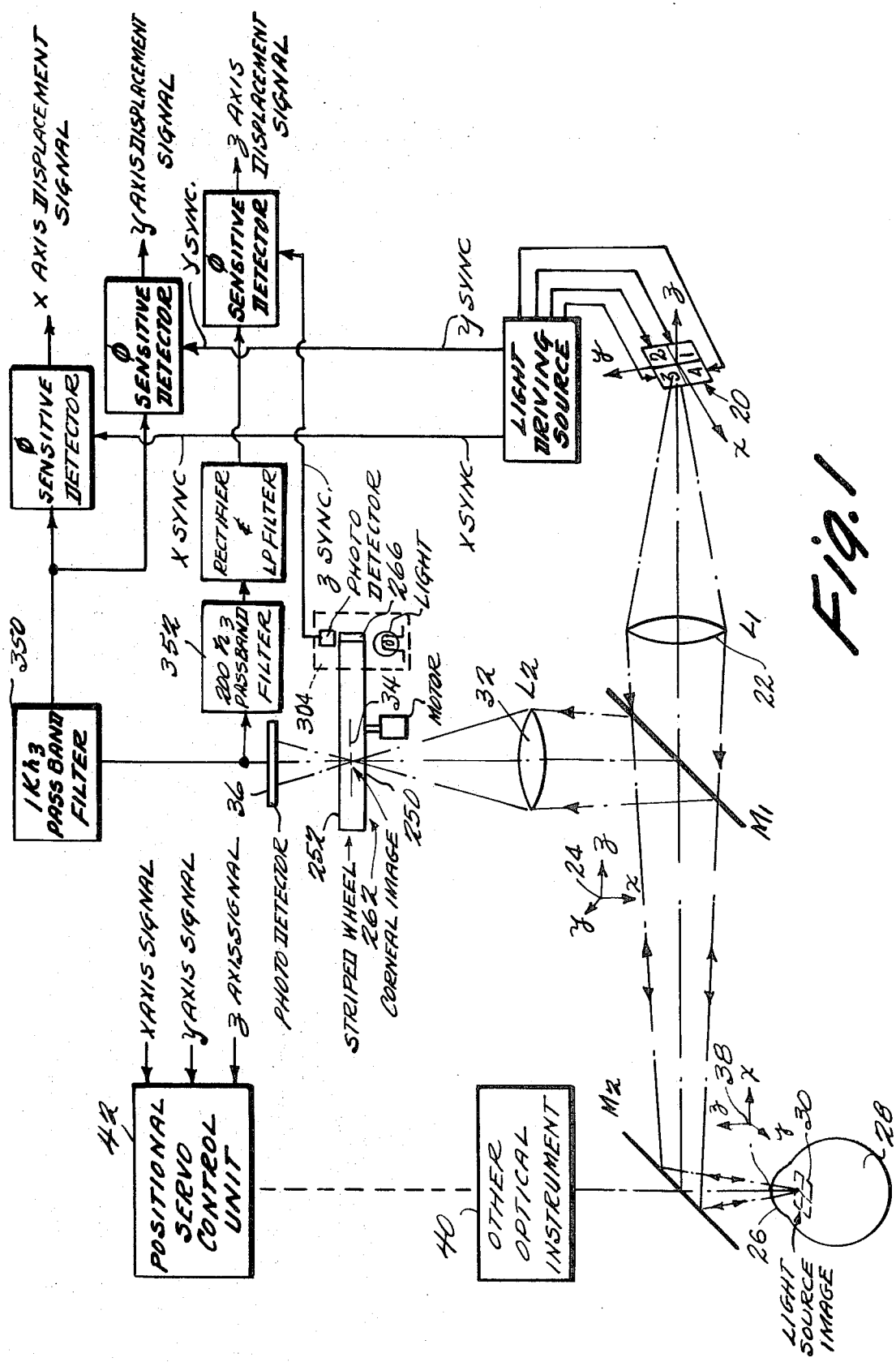
FIG. 1 is a schematic diagram of an exemplary embodiment of this invention which combines means for measuring eye displacement in all three dimensions.

A schematic diagram of one exemplary embodiment of this invention is shown in FIG. 1 and includes means for simultaneously measuring eye displacements along all three x, y and z coordinate directions. For purposes of explanation, the technique of measuring eye displacements will be separately considered for each of the coordinate directions and then the overall operation of this exemplary embodiment will be described to show how simultaneous measurements may be made in all three coordinate directions if that is desired. Of course, those in the art will readily appreciate that displacements along any single coordinate direction or any two coordinate directions may also be measured if measurement in all three coordinate directions is not necessary or desired for some reason.

The light source array 20 shown in FIG. 1 comprises a square array of four individually actuatable light sources 1, 2, 3 and 4 which may conveniently comprise light-emitting diodes. For the most part, FIG. 1 represents a top or plan view of the optical system involved in this exemplary embodiment together with a block diagram of the associated electronic equipment. However, to help visualize the positioning of the light array shown in FIG. 1, the light array 20 has been shown in perspective view from the back side as noted. Actually, the x and z axes lie in the plane of the drawing while the y axis projects above the surface of the drawing. Thus, when viewing the light source array 20 from the position of lens 22 (also denoted as $L_1$), light sources 1 and 2 lie to the left hand side in the negative x axis direction while light sources 3 and 4 lie to the right hand side in the positive x axis direction. Similarly, light sources 2 and 3 lie toward the top of the light source array in the positive y direction while light sources 1 and 4 lie toward the bottom of the light source array in the negative y direction. Perhaps a more accurate depiction of the x, y and z coordinates with respect to the drawing plane can be seen at 24 where the x and z axes are more correctly shown within the plane of the drawing with the y axis projecting therefrom.

Light emanating from the light source array 20 is transmitted by the lens 22 (also denoted as $L_1$) and partially transmitted by a beam splitting mirror $M_1$ located at a substantially 45° angle with respect to the optic axis of lens 22 as will be appreciated by those in the art. Light reflected downwardly from beam splitting mirror $M_1$ is not utilized. Light passed by the beam splitter is then reflected from dichroic mirror $M_2$ (also located at 45° with respect to the optic axis of lens 22 as should be appreciated) and onto the cornea 26 of an eye 28. Preferably, the light source is imaged by lens 22 at a point slightly behind the cornea 26 such as in the plane of the eye pupil. The actual image (shown at 30) of the light source array within the eye of the patient would, of course, be formed from the light actually transmitted by the cornea 26.

However, we are concerned with light which is reflected from the cornea 26 and not that which is transmitted by the cornea. Since the cornea is actually a partially reflecting convex mirror, a virtual image will be formed by the reflected light, which virtual image is also located slightly behind the eye cornea as should be apparent to those in the art. This light which is reflected from the cornea is also reflected again from the 45° dichroic mirror $M_2$ and then again from the 45° beam splitter $M_1$ where it is collected by lens 32 ($L_2$). Lens 32 focuses the reflected corneal image at 34 as shown in FIG. 1. A photodetector 36 is located beyond this image point 34 in line with the optic axis of lens 32 to collect equal portions of the reflected corneal image light from any half of the cornea when the eye is located at its nominally centered position as shown in FIG. 1.

As previously discussed, the general orientation of the coordinate $x, y, z$ system is depicted at 24. However, after reflection through the 45° dichroic mirror $M_2$, this coordinate system is rotated 90° as shown in FIG. 1. Thus, at the eye's location (true origin of the $x, y, z$ coordinate system) the positive $x$ axis extends toward the eye's right while the positive $z$ axis extends in the plane of the paper toward $M_2$ and the $y$ axis will project upwards from the plane of the drawing. This rotated relationship is depicted at 38. Actually, the true origin of the $x, y, z$ coordinate system 38 is located at the exact center of the eye cornea 26, when it is in its nominally centered location as shown in FIG. 1; however, for convenience in illustration, the coordinate system 38 has been shown slightly displaced.

Thus, when the eye is in its nominally centered position (the center of the cornea being located at the origin of the $x, y, z$ coordinate system 38), the $z$ axis is aligned with the optic axis of the eye 28 while the $x$ and $y$ axes lie in a plane substantially perpendicular thereto. Right hand and left hand displacements of the eye 28 as shown in FIG. 1 then correspond to positive and negative $x$ axis displacements respectively. Upward and downward displacements (above and below the plane of FIG. 1, respectively) are in correspondence to positive and negative $y$ axis displacements, respectively. Displacements of the eye 28 toward the mirror $M_2$ would be in the positive $z$ axis direction while displacements rearwardly thereof would correspond to displacements in the negative $z$ axis direction, all of which should now be apparent from FIG. 1.

If the instrument is to be used in connection with other instruments that measure aspects of the vision of the eye, it is desirable that the light arriving at the eye be in the infrared region of the spectrum, so that it does not interfere with normal visual functions. This can be accomplished either by placing the appropriate filter between the source and $L_1$, or by using light sources that emit only infrared light.

About 2.5 percent of the light incident on the eye is reflected from the surface of the cornea, which acts as a strongly curved convex mirror (radius of curvature of about 7 mm.). Because the cornea is a convex mirror, a virtual image of the array 20 is formed approximately 3.5 mm behind the front surface of the cornea. Lens $L_2$ forms another image of this reflected light in the middle of the disk 262 as indicated in FIG. 1.

If this embodiment of the invention is to be used as part of a servo-control loop for maintaining predetermined relationships between the eye and some other optical instrument 40, the optical instrument 40 would be positioned to permit simultaneous access to the eye 28. For instance, as shown in FIG. 1 the other optical instrument 40 might be in line with the eye 28 behind the dichroic mirror $M_2$. Assuming that light wavelengths of interest with respect to the other optical instrument 40 are passed by the dichroic mirror, the other optical instrument 40 may function in its conventional or normal fashion. However, the movements of the eye 28 with respect to its nominally centered position (as determined by the placement of the lenses, mirrors, photodetector and light choppers as should be apparent) will be detected and provide $x, y, z$ axis signals indicative of these displacements which may be used in conventional servo mechanism 42 for providing corrective movements of the other optical instrument 40 thus maintaining the desired predetermined relationships between the eye 28 and this other optical instrument.

As may be verified by elementary optics, when the eye 28 is located exactly at its nominal position, light sources 1 and 2 (located toward the negative $x$ direction) will light a portion of the eye cornea 26 in the negative $x$ direction or on the left hand side of the eye cornea 26 as shown in FIG. 1. This light will then be reflected from the left half of the cornea 26 and will then fall on one half of photodetector 36 as should be apparent by looking at FIG. 1. On the other hand, light coming from sources 3 and 4 (positive $x$ direction) will light the right half of the eye cornea 26. Reflected light from the right half of the eye cornea will be reflected by the two mirrors and collected by lens 32 and passed to the other side of photodetector 36 as shown in FIG. 1.

Referring now to FIG. 2, the net result of this situation is depicted in simplified form. As shown in FIG. 2, light which originates on the left side of the light array 20 (lights 1 and 2) illuminates the left half of the cornea 26 from which some of this light is reflected and collected by lens 32. On the other hand, light originating on the right side of the light array (lights 3 and 4) illuminates the right hand side of the cornea 26 from which part is reflected and again collected by the lens 32. As shown in FIG. 2, when the eye 28 is located in its nominally centered position, the lens 32 collects approximately equal amounts of illumination from light originating on either the right hand side of the light array or the left hand side of the light array 20.

This situation is changed, however, when the eye 28 is displaced in either the positive or negative $x$ directions. For instance, as shown in FIG. 3 when the eye is displaced to the right of its nominally centered position (translated along the $x$ axis direction in the positive sense) the center line of the reflected light no longer coincides with the optic axis of lens 32. Now, the light originating on the left side of the light array from lights 1 and 2 largely misses the lens 32 while light originating from lights 3 and 4 is almost totally collected by the lens 32 and passed on by the photodetector 36. This is, of course, due to the curvature of the cornea 26 which acts as a convex mirror as previously noted. The magnitude of the displacement in the $x$ direction will also bear a predetermined relationship with respect to the relative increase in illumination of lens 32 coming from lights 3 and 4 and the relative decrease in illumination coming from lights 1 and 2.

Now, if the pair of lights 1 and 2 is alternately activated with respect to the pair of lights 3 and 4, the left hand side and right hand side of the cornea 26 will be alternately illuminated as should now be apparent.

When the eye is located in its nominally centered position as shown in FIG. 2, equal light will be received by the lens 32 regardless of which light pair has been activated. Accordingly, in this situation, the output of the photodetector 36 will be substantially constant. On the other hand, if the eye is displaced along the x axis and the light pairs 1,2 and 3,4 alternately activated in a regular pattern, an a.c. signal will be produced as the output of photodetector 36. The phase of this a.c. signal with respect to the alternate illumination of the cornea 26 will depend upon whether the eye 28 has been displaced in the positive or negative x directions as should now be apparent. Furthermore, the magnitude of the photodetector output will be proportional to the magnitude of the displacement.

Referring to FIG. 4, where square waveforms are shown for illustration, waveform 50 represents the sequential on-off activation of light pair 1 and 2 while waveform 52 represents a similar activation of light pair 3 and 4. Light pairs 1,2 or 3,4 are alternately energized as shown by the cross-hatched portions of the waveforms.

When the eye 28 is in its nominally centered position, the photodetector output is a substantially constant d.c. level as shown at waveform 54. On the other hand, when the eye is displaced to the right, an a.c. component will be superimposed on the photodetector output to result in an a.c. signal which is in-phase with waveform 52 as shown in FIG. 4 at the waveform 56. Similarly, if the eye is displaced to the left, an a.c. signal will be generated at the photodetector output which is in-phase with the waveform 50 (or out-of-phase with waveform 52) as shown at waveform 58 in FIG. 4. In other words, the direction of eye displacement (i.e., positive or negative x directions) may be detected by comparing the phase of the photodetector output with the phase of either waveform 50 or 52. If the photodetector output is compared with the phase of waveform 50, then negative x axis displacements will correspond to an in-phase relationship while positive x axis displacements will correspond to an out-of-phase relationship. Just the converse would be the case if the photodetector outputs are compared with the waveform 52 as should now be apparent. In either case, the magnitude of the a.c. component will be approximately proportional to the magnitude of the displacement. Accordingly, both the magnitude and direction of displacements in the x axis direction cana be detected by making a phase sensitive detection of the photodetector output as should now be apparent.

It should also be apparent that eye displacements along the y axis direction might be similarly detected in both directions and magnitude by alternate energization of light sources in the positive and negative y axis direction such as light pair 2 and 3 in alternation with light pair 1 and 4. By substituting up and down for the right hand and left hand directions previously discussed with respect to the x axis, the operation for detecting eye displacements along the positive and negative y axis directions is directly analogous to that already discussed with respect to the x axis direction detections. Here light pair 1, 4 would illuminate the top half (+y) of cornea 26 while light pair 2, 3 would illuminate the bottom (−y) half of cornea 26 when the eye 28 is in the nominally centered position.

If the x axis is considered the horizontal direction while the y axis is considered the vertical direction, an exemplary embodiment of electrical apparatus for measuring simultaneous displacements in both the horizontal and vertical directions may be seen at FIG. 5. Here, the source array of light sources 1, 2, 3 and 4 are sequentially energized in a cyclic fashion with the next sequentially numbered light being turned on for a substantial time period before the previous light source is turned off. In this fashion, the energized light sources will actually trace out a rotation around the square light source array.

The light driving means for accomplishing such rotational energization of the light sources 100 is shown in FIG. 5 schematically. It comprises light drivers 102 and a timing control mechanism 104 which produces a vertical driving control signal at 106 as well as a horizontal driving control signal at 108. In addition, a vertical (or y axis) synchronization signal a is produced on lead 110 while a horizontal (or x axis) synchronization signal d is produced on lead 112.

After reflection from the eye cornea and collection by lens 32, the collected light is passed on to a photodetector 36 as previously discussed. The output of the photodetector 36 is detected by a conventional phase sensitive demodulator 114 which is also connected to receive the x axis synchronization signal d and thus produce a horizontal output at 116 representing both the direction and magnitude of eye displacements in the x axis direction as should now be apparent. Similarly, the y axis synchronization signal a on line 110 is connected to a similar conventional phase sensitive demodulator 118 which also receives the output of the photodetector 36. The phase sensitive demodulation process then produces a vertical output signal at 120 representing both the magnitude and direction of eye displacement in the y axis directions as should now also be apparent.

The photodetector 36 and phase sensitive demodulators 114 and 118 are well known in the art and therefore detailed description of these elements is believed unnecessary.

Figure 6:
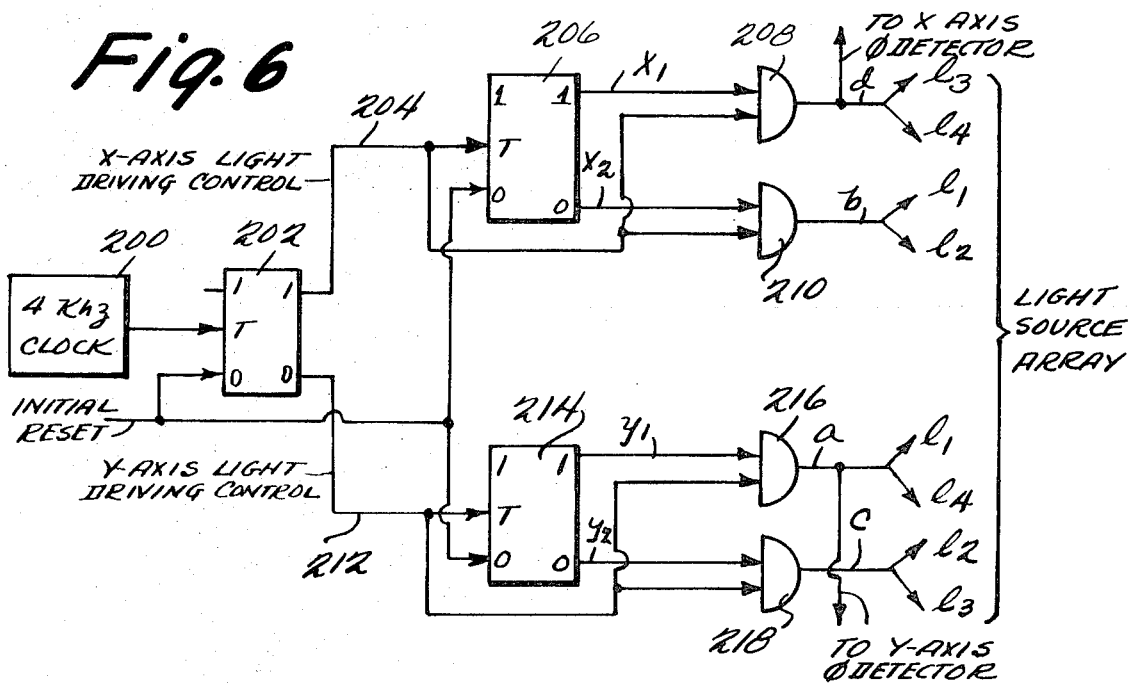
FIG. 6 is a schematic diagram of an exemplary light driving means for use with this invention.

The exemplary embodiment of a suitable light driving means 100 is shown in more detail at FIG. 6. Here a source of clock pulses 200 triggers a first flip-flop 202 between its "1" and "0" states as will be appreciated by those in the art. The 1 output of flip-flop 202 on line 204 is used to trigger flip-flop 206 and the outputs $x_1$ and $x_2$ of this flip-flop are individually connected to inputs of AND gates 208 and 210 as shown in FIG. 6. The output of AND gate 208 is used to drive both lights 3 and 4 while the output of AND gate 210 is used to drive both lights 1 and 2. The AND gates 208 and 210 have second inputs which are both connected to receive the x axis light driving control signal on line 204 as shown in FIG. 6.

The other output of flip-flop 202, the y axis light driving control on line 212, is used to trigger another flip-flop 214. The outputs of flip-flop 214, $y_1$ and $y_2$ are individually input to AND gates 216 and 218. The output of AND gate 216 is used to activate lights 1 and 4 while the output of AND gate 218 is used to activate lights 2 and 3. Second inputs to both AND gates 216 and 218 are supplied from the y axis light driving control signal on line 212 as shown in FIG. 6. The x axis synchronization signal is taken from output d of AND gate 208 while the y axis synchronization signal is taken from output a of AND gate 218.

Figure 7:
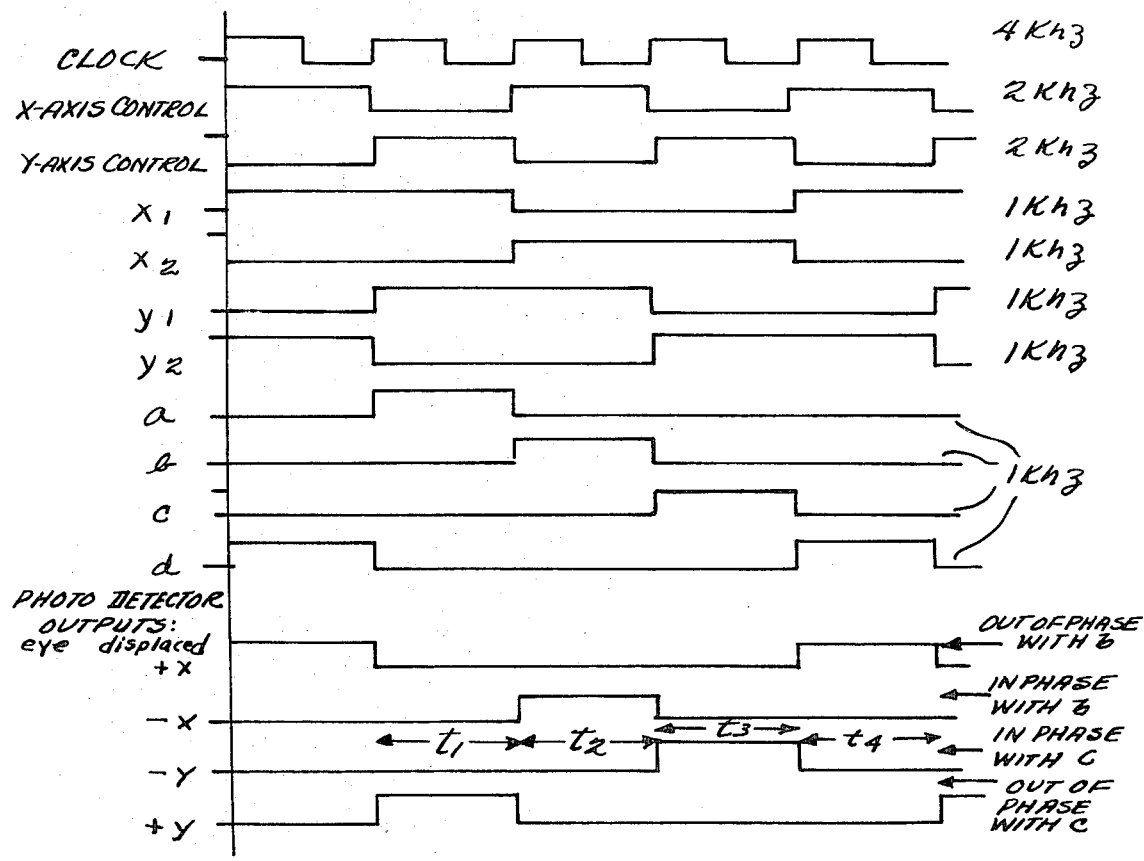
FIG. 7 is a diagram depicting the relationships between various signals in the apparatus shown in FIG. 6 and a photodetector output resulting therefrom for various eye displacements in the x and y coordinate directions.

The operation of the light driving means shown in FIG. 6 may be more clearly appreciated by referring to the waveforms shown in FIG. 7. At the top of FIG. 7, clock pulses are shown which recur at a 4 Khz frequency. The $x$ axis control signal on line 204 is shown s a 2 Khz signal while the $y$ axis control signal on line 212 is exactly 180° out of phase with the $x$ axis control signal and this signal also occurs at a 2 Khz frequency.

The $x_1$ and $x_2$ outputs of flip-flop 206 are next shown in FIG. 7. As those in the art will appreciate, the frequency of these signals is again one-half of the input frequency to flip-flop 206 or 1 Khz and these signals are also 180° out of phase with respect to one another. Similarly, the outputs $y_1$ and $y_2$ of flip-flop 214 are shown to be 180° out of phase with one another and occurring at a 1 Khz rate. Furthermore, it is noted that the outputs $x_1$, $x_2$, and $y_1$, $y_2$ are respectively 90° out of phase with respect to one another.

The output of AND gate 216 (indicated by $a$ in FIG. 6) is turned "on" to activate lights 1 and 2 only when both the $y$ axis control signal and the signal $y_1$ are concurrently on. Similar analysis can be made for the other outputs $b$, $c$ and $d$ of the AND gates 210, 218 and 208.

The result is shown in FIG. 7 where in a first time period $t_1$ lights 1 and 4 are on followed by energization of lights 1 and 2 in time period $t_2$; lights 2 and 3 in time period $t_3$; and, finally, lights 3 and 4 in time period $t_4$. Accordingly, the lights are sequentially energized in successive time periods $t_1$, $t_2$, $t_3$, and $t_4$ with each light remaining on for two successive time periods. That is, light 1 remains on during time period $t_1$ and $t_2$, light 2 remains on during time period $t_2$ and $t_3$, light 3 remains on during time period $t_3$ and $t_4$, while light 4 remains on during time period $t_4$ and $t_1$. Of course, the whole process is cyclic and is repeated again and again.

Now, if waveforms $d$ and $a$ are considered to be the $x$ axis synchronization signal and the $y$ axis synchronization signal, respectively, the phase relationships existing between these synchronization signals and the photodetector outputs for various eye displacements may be observed. For instance, as shown in FIG. 7 a displacement in the positive $x$ direction will result in a photodetector output in phase with waveform $d$ or in other words which occurs in phase with simultaneous energizatin of light sources 1 and 2. On the other hand, movements in the negative $x$ direction will result in photodetector outputs that are out-of-phase with waveform $d$ (or in-phase with waveform $b$) as shown in FIG. 7. Displacements in the positive $y$ direction result in detector outputs that are in-phase with waveform $a$ while displacements in the negative $y$ direction result in photodetector outputs that are out-of-phase with waveform $a$ (or in-phase with waveform $c$) as should now be apparent. Accordingly, with the rotational energization of the light source array as described above, simultaneous monitoring of eye movements in either the $x$ or $y$ coordinate directions may be easily achieved.

If the aperture of lens $L_2$ is square and the photodetector output is linear with light intensity falling on it, then the outputs of the two demodulators will be linearly related to the $x$ and $y$ positions of the eye with respect to the instrument.

The dichroic mirror $M_2$ has no function whatever as far as the alignment instrument itself is concerned. Its function is to permit the alignment instrument to be used in conjunction with any other instrument, as indicated in FIG. 1. The dichroic mirror $M_2$ reflects infrared light from the alignment instrument into the eye while transmitting the non-infrared light to the eye that may come from the other instrument.

Eye displacements along the $z$ axis require a somewhat different mode of detection. Here, use is made of the fact that the corneal reflection image 34 is normally located mid-way between two light chopping means 250 and 252 as shown in FIG. 1. This, of course, assumes that the eye is located in its nominally centered position. As the eye is moved in the negative $z$ direction away from mirror $M_2$, the corneal image 34 will likewise move toward the light chopping means 250. On the other hand, when the eye 28 moves in the positive $z$ direction, the corneal reflection image 34 will move toward the light chopping means 252. As previously explained, the percentage modulation effected by the light chopping means increases as the position of the corneal image 34 approaches the actual location of the light chopping means. By detecting the phase relationship between actuation of the light chopping means and the modulation envelope, the direction of movement may be detected in the $z$ axis direction.

Assume, for explanation purposes, that the front surface of the disk 262 is entirely covered by opaque and clear stripes, as in FIG. 9. Now suppose that the eye were moved just far enough away from the instrument that the corneal image fell exactly in the plane of the front of the disk. As the disk spins, the light reflected from the cornea will be alternately transmitted through the clear spaces of the disk and blocked by the opaque ones, so that a strong alternating signal will be generated by the photodetector. Now, if the eye were moved, say, closer to the instrument, the corneal image would move behind the surface of the disk, and the light incident on the surface of the disk would form a blur circle (or square, if $L_2$ is square) whose diameter is proportional to the axial position of the eye. Further, if the blur circle diameter is greater than the width of the opaque stripes, the intensity of the light passing through the stripes and on to the photodetector will not turn completely on and off as the stripes go by, and will be less than 100 percent modulated. Therefore, the fluctuations in the output of the photodetector will be largest when the corneal image is focussed exactly on the stripes, and will be reduced in strength in proportion to the distance beteen the plane of the stripes and the plane of the image. Thus, one could, in principle, move the eye back and forth until the detector output fluctuations were at a maximum, and that would guarantee that the eye is in exactly the desired axial position.

However, a preferable alternative to seeking the maximum signal is shown in FIG. 8. The face of the disk contains sectors that are striped and others that are clear, and at the back of the disk there are clear sectors aligned with the striped sectors on the front. Therefore, as the disk rotates, stripes are alternately introduced into the light path at two different distances from the eye. If the eye were aligned so that the corneal image fell on the plane of the front of the disk, then the detector output would fluctuate strongly when its stripes were in the beam and less strongly when the stripes at the back of the disk were in the beam. If the eye is placed so that the corneal image falls just half way between the front and the back of the disk, then the signal fluctuations resulting from all sectors of the disk will be equal. Thus, by looking at the detector output, it is possible to adjust the position of the eye until the fluctuations are of constant amplitude, and then the eye is in precisely the desired axial position.

Figure 11:
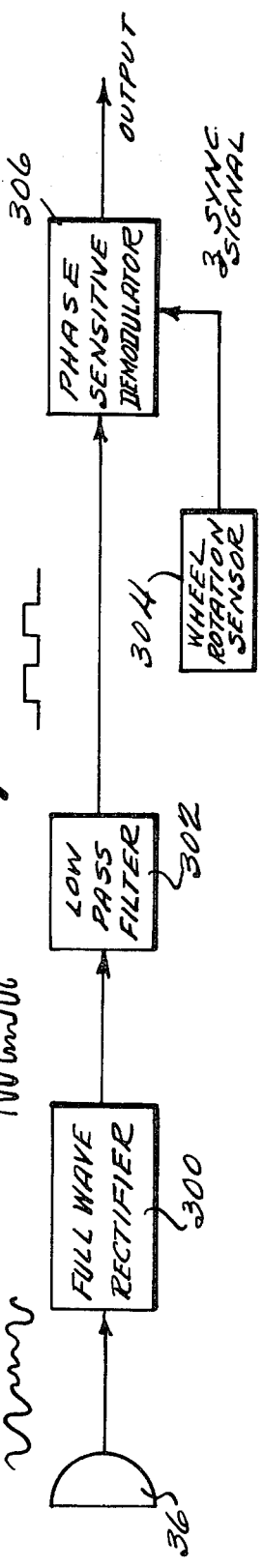
FIG. 11 is a schematic diagram of an exemplary system for processing the photodetector outputs and detecting movements of the eye along the z axis.

To ease the task of interpreting the detector output signals, the circuits in FIG. 11 may be used. The detector output is fed into a full-wave rectifier and then a low-pass filter, the output of which is proportional to the amplitude of the signal fluctuation. This signal is then passed through a phase-sensitive demodulator that is synchronized to the wheel rotation in such a way that its output is positive when the corneal image is nearer the front of the disk, negative when the image is nearer the back of the disk, and zero when the image is exactly halfway between the two surfaces.

Now, in somewhat more detail, the exemplary embodiment of a suitable first and second light chopping means 250 and 252 respectively is shown in more detail at FIG. 8. The eye chopping means 250 includes sectors of light stopping stripes 260 on the front surface of a transparent disk 262 while the light chopping means 252 comprises similar sectors of spaced light blocking stripes 264 on the opposite side of the transparent disk 262. Each opaque stripe is wider than the corneal image. The thickness of the transparent disk is twice the maximum measurable deviation along the z axis in either the positive or negative directions.

For synchronization purposes, additional bands of light blocking or reflective material 266 are associated with the sectors on light chopping means 250. Of course, those in the art will readily appreciate that similar synchronization means could have been included on light chopping means 252 if desired. Furthermore, the synchronization bands 266 might be associated with the clear or transparent sectors of the light chopping means which alternate with the striped sectors 260 and 264.

As shown in FIG. 8, the striped sections 260 on the front surface of disk 262 are directly opposite clear or transparent sectors on the back surface of disk 262. Accordingly, as the disk 262 is rotated, the light chopping means 250 will be active when a sector of stripes 260 intercepts the corneal reflected light while light chopping means 252 will be active when its striped sections 264 intercept the corneal reflected light. As will be appreciated, as the disk 262 is rotated, the first and second light chopping means are alternately actuated.

The bands 266 are used to obtain a synchronization signal representative thereof for phase measurements in the z axis direction. In the exemplary embodiment, light is blocked by the bands 266 when the light chopping means 252 is active and passed by the bands when light chopping means 250 is activated. Accordingly, by photodetecting such light which is alternately stopped and passed by the bands 266, a z-axis synchronization signal may be generated which provides information as to which one of the light chopping means is activated.

Figure 10:
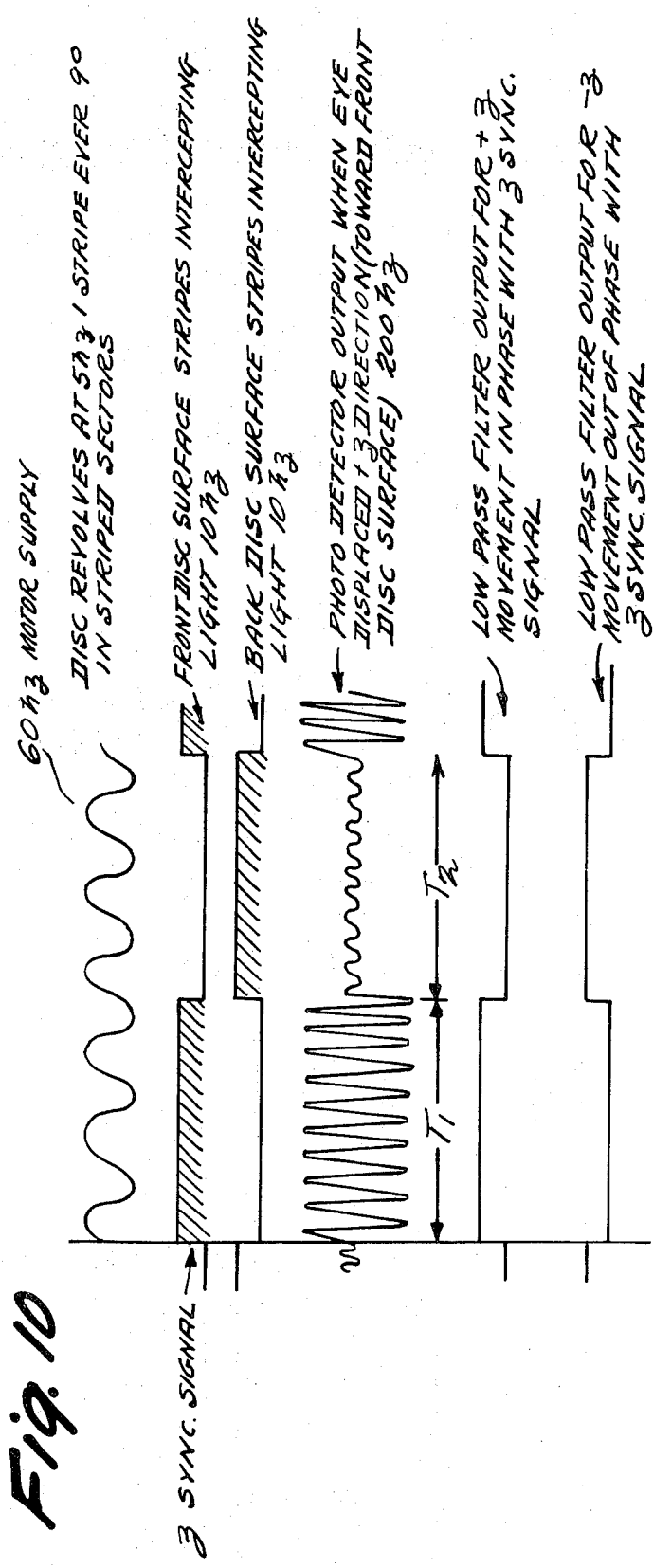
FIG. 10 depicts electrical signals useful in explaining how eye movements along the z axis are detected.

Perhaps the operation of the system with respect to detection of the z axis movements can best be described by observing the waveforms shown in FIG. 10. Assuming that a synchronous motor is used to drive the disk 262 (and depending upon the configuration of the motor and the gearing relationship between it and the wheel or the disk), a definite relationship will exist between the normal 60 Hz supply current and the rotation speed of the disk. For purposes of illustration, it will be assumed that the disk revolves at 5 revolutions per second and that the stripes in the active portions of each light chopping means are located every 9° in the striped sectors to result in a modulation frequency of 200 Hz as may be verified by the usual arithmetic.

As shown in FIG. 10, the z axis synchronization signal will be turned on for 3 cycles of the 60 Hz supply and then off for the next 3 cycles, etc. This signal might, for instance, represent the point in time when the front disk striped sectors 260 are intercepting the corneal reflected light. On the other hand, those in the art will readily recognize that a similar z axis synchronization signal might also be derived representing points in time when the back striped sectors 264 are intercepting the reflected corneal light.

When the position of the reflected corneal image is quite near the front surface or light chopping means 250, the percentage of modulation produced by the light chopping means 250 will be much greater than that produced by the light chopping means 252. Accordingly, as shown in FIG. 10, during the time period $T_1$ when the first light chopping means is activated, a photodetector output will be highly modulated at the 200 Hz rate. On the other hand, during time period $T_2$, when the second light chopping means 252 is activated, a relatively smaller percentage of modulation will be apparent in the photodetector output. If the envelope of the photodetector output 200 Hz modulation is detected, and low pass filtered, then outputs might be obtained as shown in FIG. 10 which are in-phase with the z-axis synchronization signal for movements of the eye in the positive z coordinate direction and out-of-phase with the z axis synchronization signal for movements of the eye in negative z axis direction, all as shown in FIG. 10.

A typical apparatus for achieving this last prescribed technique is shown in FIG. 11. The photodetector 36 is the same as previously described. The output of the photodetector 36 is passed to the conventional full wave rectifier 300 and on to a low pass filter 302 of conventional design. The z axis synchronization signal from wheel rotation sensor 304 is input together with the output of the low pass filter 302 to a conventional phase sensitive demodulator 306. As will be appreciated by those in the art, the output of the phase sensitive demodulator will represent both the direction and magnitude of the movements in the z direction.

Now referring back to FIG. 1, it will be noted that this embodiment includes subsystems for detecting $x$, $y$ and $z$ axis direction movements substantially as previously described. However, a 1 Khz pass-band filter 350 and a 200 Hz pass band filter 352 have been included for reasons which will soon become apparent.

In the exemplary embodiment just discussed, the signal coming from the photodetector 36 representing movements in the $x$ and $y$ coordinate axis directions occurs at a rate of approximately 1 Khz and, accordingly, these signals will be passed by the 1 Khz pass-band filter 350 on to the phase sensitive detectors for the $x$ and $y$ axis directions as previously discussed.

On the other hand, the modulation introduced by the light chopping means 250 and 252 will be at an approximately 200 Hz rate and this modulation content will be passed by the 200 Hz pass-band filter 352 and thus separated from the signals representing eye displacements in the $x$ and $y$ directions as should now be apparent. The output of the 200 Hz pass-band filter is then input to a rectifier and low pass filter as previously discussed to produce an output for use in a phase sensitive detector for detecting movements in the z direction as previously discussed. Accordingly, the embodiment shown in FIG. 1 may be utilized for simultaneous monitoring of movements in all three coordinate axes.

While only a few specific embodiments of this invention have been specifically described above, those in the art will readily appreciate that many modifications can be made in these specific exemplary embodiments without in any way departing from the spirit of this invention or detracting from the advantages and objectives enumerated above. Accordingly, all such modifications are intended to be included within the scope of this invention.

What is claimed is:

1. An eye position measuring device for detecting relative eye position by measuring reflections from the eye's cornea, said device comprising:
   source means for selectively providing light energy emanating from different ones of at least two physically distinct positions and for providing a synchronization signal representative of the sequence with which light is caused to emanate from the distinct positions,
   light transmitting means for directing said light energy onto said cornea,
   light receiving means for collecting a portion of said light energy after reflection from said cornea,
   photodetecting means for converting reflected light passed by said receiving means into a photodetector output signal, said photodetecting means being aligned with the receiving means to provide substantially equal illumination thereof due to light emanating from either of said distinct positions when the cornea center is in alignment with an optical axis of said receiving means, and
   phase sensitive detecting means electrically connected to said source means and to said photodetecting means for comparing the phase of said photodetector output signal with that of said synchronization signal to thereby provide a signal representing the relative direction of cornea displacement from an aligned position and hence representative of a corresponding relative eye position.

2. An eye position measuring device as in claim 1, wherein said source means comprises:
   an array of at least two light sources, and
   electrical driving means connected thereto for alternately energizing said at least two light sources and for providing said synchronization signal.

3. An eye position measuring device as in claim 1, adapted to simultaneously monitor eye position displacements along both $x$ and $y$ axes in an orthogonal $x$, $y$, coordinate system, said $x$ and $y$ axes being perpendicular to the eye's optical axis, wherein:
   said source means includes means for alternately producing light energy from positions corresponding to the positive and negative $x$-axis directions and for producing an $x$-axis synchronization signal,
   said source means also includes means for alternately producing light energy from positions corresponding to the positive and negative $y$-axis directions and for producing a $y$-axis synchronization signal,
   said phase sensitive detecting means includes a first detector for comparing the phase of said photodetector output signal with said $x$-axis synchronization signal to produce an $x$-axis displacement signal representative of the direction and magnitude of eye movement along the $x$-axis, and
   said phase sensitive detecting means also includes a second detector for comparing the phase of said photodetector output signal with said $y$-axis synchronization signal to produce a $y$-axis displacement signal representative of the direction and magnitude of eye movement along the $y$-axis.

4. An eye position measuring device as in claim 3, wherein the source means interleaves the alternate production of light in the $x$-axis directions with the alternate production of light in the $y$-axis direction.

5. A closed loop servo system including an eye position measuring device as in claim 1 for automatically maintaining a predetermined physical relationship between another optical apparatus and said device, said system further comprising:
   positional servo control means for physically adjusting the relative physical relationship between said optical apparatus and said device, and
   said positional servo control means being connected to and controlled by said signal representing the relative direction of cornea displacement.

6. An eye position measuring device for detecting relative eye position by measuring reflections from the eye's cornea, said device comprising:
   source means for selectively providing light energy emanating from different ones of at least two physically distinct positions and for providing a synchronization signal representative of the sequence with which light is caused to emanate from the distinct positions,
   light transmitting means for directing said light energy onto said cornea,
   light receiving means for collecting a portion of said light energy after reflection from said cornea,
   photodetecting means for converting reflected light passed by said receiving means into a photodetector output signal, said photodetecting means being aligned with the receiving means to provide substantially equal illumination thereof due to light emanating from either of said distinct positions when the cornea center is in alignment with an optical axis of said receiving means,
   phase sensitive detecting means electrically connected to said source means and to said photodetecting means for comparing the phase of said photodetector output signal with that of said synchronization signal to thereby provide a signal representing the relative direction of cornea displacement from an aligned position and hence representative of a corresponding relative eye position,
   said source means comprising an array of at least two light sources, and electrical driving means connected thereto for alternately energizing said at least two light sources and for providing said synchronization signal,
   said array comprising four separate light sources arranged in a square array, and
   said electrical driving means comprising circuits for sequentially energizing the sources to effect rotation of the areas emanating light, said rotation being about an axis normal to the plane of said planar array and passing through its center thereby permitting substantially simultaneous measurement of eye movements in two coordinates within a plane perpendicular to the eye's optical axis.

7. An eye position measuring device as in claim 6, wherein said electrical driving means includes means for simultaneously energizing two adjacent ones of said light sources during said rotation.

8. An eye position measuring device for detecting relative eye position by measuring reflections from the eye's cornea adapted to simultaneously monitor eye position displacements along $x$, $y$, and $z$ axes in an orthogonal $x$, $y$, $z$ coordinate system, said $x$ and $y$ axes being perpendicular to the eye's optical axis, and the $z$ axis being directed along the eye's optical axis, said device comprising:

source means for selectively providing light energy emanating from different ones of at least two physically distinct positions and for providing a synchronization signal representative of the sequence with which light is caused to emanate from the distinct positions, light transmitting means for directing said light energy onto said cornea, light receiving means for collecting a portion of said light energy after reflection from said cornea, photodetecting means for converting reflected light passed by said receiving means into a photodetector output signal, said photodetecting means being aligned with the receiving means to provide substantially equal illumination thereof due to light emanating from either of said distinct positions when the cornea center is in alignment with an optical axis of said receiving means, phase sensitive detecting means electrically connected to said source means and to said photodetecting means for comparing the phase of said photodetector output signal with that of said synchronization signal to thereby provide a signal representing the relative direction of cornea displacement from an aligned position and hence representative of a corresponding relative eye position, said source means including means for alternately producing light energy from positions corresponding to the positive and negative $x$-axis directions and for producing in $x$-axis synchronization signal, said source means also including means for alternately producing light energy from positions corresponding to the positive and negative $y$-axis directions and for producing a $y$-axis synchronization signal, said phase sensitive detecting means including a first detector for comparing the phase of said photodetector output signal with said $x$-axis synchronization signal to produce an $x$-axis displacement signal representative of the direction and magnitude of eye movement along the $x$-axis.

said phase sensitive detecting means also including a second detector for comparing the phase of said photodetector output signal with said $y$-axis synchronization signal to produce a $y$-axis displacement signal representative of the direction and magnitude of eye movement along the $y$-axis, light chopping means for alternately chopping light passing through said receiving means at predetermined locations on each side of a focussed corneal reflection image whereby the degree of modulation produced in light passing through the light chopping means is dependent upon the relative distances between the focussed corneal reflection image and said predetermined locations, the envelope of the modulation being in-phase with the light chopping at the nearest of said predetermined locations, said light chopping means also producing a $z$-axis synchronization signal representing the timing of the alternate chopping at said predetermined locations, and a third detector for comparing said photodetector output signal with said $z$-axis synchronization signal to produce a $z$-axis displacement signal representative of the direction and magnitude of eye movement along the $z$-axis.

9. An eye position measuring device as in claim 8, wherein said light chopping means comprises:

a rotatable transparent disk having alternate sectors of spaced light blocking stripes therein on each side of the disk, a sector of stripes on one surface being opposite a transparent sector on the other surface, and said disk surfaces being located in planes respectively passing through said predetermined locations.

10. An eye position measuring device as in claim 8, wherein:

said first and second detectors are connected to receive said photodetector output signal through a filter circuit for blocking the modulation frequency introduced by said chopping means, and said third detector is connected to receive said photodetector output signal through another filter circuit for blocking the signal frequencies caused by the sequential changes of light emanating from said source means.

11. A method for detecting eye displacements by measuring reflections from the eye's cornea, said method comprising:

alternately illuminating different parts of said cornea, collecting at least a first portion of the light reflected from the cornea when in a nominally centered position and illuminated on a first part thereof, collecting at least a second portion of the light reflected from the cornea when in a nominally centered position and illuminated on a second part thereof, said first and second portions being substantially equal when the cornea is in said nominally centered position, converting said first and second portions into an electrical signal which is substantially d.c. signal when the cornea is in said nominally centered position, and comparing the phase relationships between said electrical signal and said alternate illumination of different parts of the cornea to measure the direction of eye displacements.

12. A method as in claim 11, further comprising:

measuring the amplitude of said electrical signal to provide a measurement of the magnitude of said eye displacements.

13. A method as in claim 11, further comprising:

controlling the relative positioning between an optical apparatus and said eye in response to said electrical signal.

14. A method as in claim 11, further comprising:

forming an image at a predetermined image location when the cornea is in said nominally centered position, of light reflected from said cornea, chopping said reflected light at a first position displaced from said image location, measuring the percentage of modulation introduced in said electrical signal at the frequency of said chopping to provide a measurement of the magnitude of eye displacements along the optical axis of the eye.

15. A method as in claim 14, wherein:
said chopping step comprises alternate chopping at both said first position and another second position, said image location being half way therebetween, and
said measuring step comprises detecting the envelope of said modulation and comparing its phase with the phase of the alternate chopping to derive a measurement of the direction of eye displacements along the optical axis of the eye.

* * * * *